United States Patent Office 3,196,165
Patented July 20, 1965

3,196,165
N-ALKANOYLAMIDO-5-NITRO-2-FURAMIDINES
Homer Albert Burch, Norwich, N.Y., assignor to The Norwich Pharmacal Company, a corporation of New York
No Drawing. Filed Jan. 9, 1964, Ser. No. 336,640
6 Claims. (Cl. 260—347.3)

This invention relates to new chemical compounds. More particularly it relates to novel nitrofuran compounds which may be called N-alkanoylamino-5-nitro-2-furamidines of the formula:

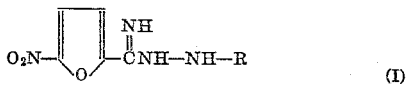

(I)

wherin R is a lower alkanoyl group preferably having 1–4 carbon atoms. This invention is also concerned with methods for the preparation of the compounds of Formula I and with compositions containing one or more of them.

The compounds of Formula I are highly effective antimicrobial agents. They are especially noteworthy for their antibacterial efficacy, being capable of controlling bacteria such as *Staphylococcus aureus*, *Streptococcus pyogenes*, *Escherichia coli*, *Proteus vulgaris*, *Erysipelothrix insidiosa* and the like in very small amounts. They are thus adapted to be combined with common pharmaceutical carriers in the form of dusts, sprays, ointments, suspensions, solution and the like to prepare compositions designed to control and eradicate the growth of bacterial organisms.

The compounds of Formula I are not limited in their antibacterial effect to mere in vitro potency for upon oral administration to animals infected with organisms such as *Staphylococcus aureus*, *Salmonella typhosa* or *Escherichia coli*, protection against mortality from them is secured. Thus, doses of the compounds of Formula I ranging from 15–200 mg./kg. effectively combat infectious processes in mice induced by the aforementioned organisms.

A further significant attribute of the compounds of Formula I is their capacity to resist metabolic destruction when ingested by animals.

The urine of animals so treated is rendered antibacterial by virtue of their metabolic resistive capacity thereby making these compounds of value in the treatment of urinary tract infections provoked by bacterial species such as *Staphylococcus aureus*, *Escherichia coli* and *Proteus vulgaris*. Concordantly, the serum of animals to whom the compounds of Formula I are orally administered is antibacterial.

The compounds of Formula I are also useful as intermediates in the preparation of other nitrofuran compounds. As revealed in my copending application Serial No. 336,643 filed on even date herewith, they can be treated with agents capable of effecting ring closure such as phosphorous oxychloride, glacial acetic acid or thermally to form 5-(5-nitro-2-furyl)-4H-1,2,4-triazoles.

The preparation of the compounds of Formula I is readily carried out. The method which is currently preferred consists in bringing together ethyl 5-nitro-2-furamidate hydrochloride and an alkanoyl hydrazide. In carrying out the reaction an inert solvent such as methanol is preferably employed as well as in an alkaline medium such as sodium methylate, which functions as an acid acceptor. To hasten the reaction heat may be applied to the reaction mixture. After the reaction is complete the mixture is quenched and the product recovered by filtration. It may be recrystallized from a suitable solvent such as ethanol.

In order that this invention may be readily available to and understood by those skilled in the art the following illustrative examples are supplied:

EXAMPLE I

*N-acetamido-5-nitro-2-furamidine (NF–1031)*

A 2-l., 3 neck flask, fitted with a stirrer, condenser, and a stopper is charged with 50 gms. (0.68 mole) of acetyl hydrazide, 150 gms. (0.68 mole) of ethyl 5-nitro-2-furamidate hydrochloride, 38 gms. (0.7 mole) of sodium methylate, and 850 ml. of methyl alchohol. The mixture is heated on a steam bath for 30 mins. After evaporating the methyl alcohol in vacuo on a warm water bath the residue is poured into water to give a brown solid in a yield of 120 gms. (83.5%). This crude product (50 gms.) is slurred in acetone to give the 43 gms. of orange solid melting at 217–218°. It may be recrystallized from ethanol twice to raise the melting point to 224–225°.

Anal.—Calcd. for $C_7H_5N_4O_4$: C, 39.64; H, 3.80; N, 26.41. Found: C, 39.76, 39.79; H, 4.06, 4.11; N, 26.32, 26.35.

EXAMPLE II

*N-propionamido-2-nitro-5-furamidine (NF–1044)*

To a solution of 10.5 g. (0.195 mole) of sodium methylate in 380 ml. of methanol is added 43 g. (0.195 mole) of ethyl 5-nitro-2-furamidate hydrochloride and 17.2 g. (0.195 mole) of propionyl hydrazide. The resulting mixture is boiled for 45 mins. The solvent is removed in vacuo on a steam bath and the residue is stirred in 500 ml. of ice water. The crude product is collected and recrystallized from ethanol. The product separates as red needles melting at 204–205° in a yeild of 21.6 g. (49%). Additional recrystallizations analysis raise the melting point to 207–207.5°.

Anal.—Calcd. for $C_8H_{10}N_4O_4$: C, 42.48; H, 4.46; N, 24.77. Found: C, 42.56, 42.44; H, 4.54, 4.49; N, 24.48, 24.41.

EXAMPLE III

*N-butyramido-5-nitro-2-furamidine (NF–1046)*

To a solution of 19.7 g. (0.36 mole) of sodium methylate in 700 ml. of methanol is added 80.0 g. (0.36 mole) of ethyl 5-nitro-2-furamidate hydrochloride and 37.0 g. (0.36 mole) of butryl hydrazide. The mixture is boiled on a steam bath for 45 mins. The solvent is removed in vacuo and the residue is swirled with ice water. The solids are collected and recrystallized from ethanol from which the product separates as orange needles melting at 202–203° in a yield of 625 g. (71.5%). Additional recrystallization gives a melting point of 199–200°.

Anal.—Calcd. for $C_9H_{12}N_4O_4$: C, 45.00; H, 5.04; N, 23.33. Found: C, 44.80, 44.62; H, 5.08, 5.11; N, 23.42, 23.59.

EXAMPLE IV

*N-formamido-5-nitro-2-furamidine (NF–1048)*

To a solution of 30.0 g. (0.55 mole) of sodium methylate in 1 l. of methanol is added 121 g. (0.55 mole) of ethyl 5-nitro-2-furamidate hydrochloride and 33.0 g. (0.55 mole) of formhydrazide. The solution is boiled for 1 hr. after which the solvent is removed in vacuo on a steam bath. The residue is shaken with 400 ml. of ice water and filtered. Recrystallization of the solids from ethanol gives the product as yellow needles in a yield of 27.3 g. Dilution of the filtrate with 250 ml. of water and further chilling gives an additional 6.2 g. The total yield is 33.5 g. (30.6%). The product melts at ca. 180°, solidifies and decomposes at 259–260°.

Anal.—Calcd. for $C_6H_6N_4O_4$: C, 36.37; H, 3.05; N, 28.28. Found: C, 36.59, 36.65; H, 3.34, 3.22; N, 28.27, 28.39.

EXAMPLE V

*N-isobutyramido-5-nitro-2-furamidine (NF–1052)*

To a solution of 27.0 g. (0.50 mole) of sodium methylate in 1.5 l. of methanol is added 111.0 g. (0.50 mole) of ethyl 5-nitro-2-furamidate hydrochloride and 56.0 g. (0.50 mole) of isobutyryl hydrazide. After boiling the mixture on a steam bath for 1 hr., the solvent is removed in vacuo to near dryness. The residue is poured into 1 l. of ice water. The solids are filtered, washed with water and recrystallized from ethanol from which the product separates as yellow needles in a yield of 100 g. (83.5%). A second recrystallization of 74 g. gives 35.8 g. of product melting at 218–218.5°. Dilution of the filtrate with water gives an additional 6.4 g. melting at 213–214°. Additional recrystallization raises the melting point to 221–222°.

*Anal.*—Calcd. for $C_9H_{12}N_4O_4$: C, 45.00; H, 5.04; N, 23.33. Found: C, 44.87, 44.97; H, 5.20, 5.18; N, 23.17, 23.19.

What is claimed is:

1. A compound of the formula:

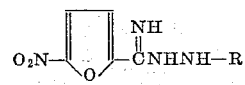

wherein R is a lower alkanoyl group.
2. N-acetamido-5-nitro-2-furamidine.
3. N-propionamido-5-nitro-2-furamidine.
4. N-butyramido-5-nitro-2-furamidine.
5. N-formamido-5-nitro-2-furamidine.
6. N-isobutyramido-5-nitro-2-furamidine.

References Cited by the Examiner

Taylor et al.: Organic Chemistry of Nitrogen (1937), page 155.

NICHOLAS S. RIZZO, *Primary Examiner.*

JOHN D. RANDOLPH, *Examiner.*

UNITED STATES PATENT OFFICE
CERTIFICATE OF CORRECTION

Patent No. 3,196,165

July 20, 1965

Homer Albert Burch

It is hereby certified that error appears in the above numbered patent requiring correction and that the said Letters Patent should read as corrected below.

Column 2, line 34, for "yeild" read -- yield --; line 47, for "butryl" read -- butyryl --; same column 2, line 52, for "625" read -- 62.5 --.

Signed and sealed this 18th day of January 1966.

(SEAL)
Attest:

ERNEST W. SWIDER
Attesting Officer

EDWARD J. BRENNER
Commissioner of Patents